Figure 1:
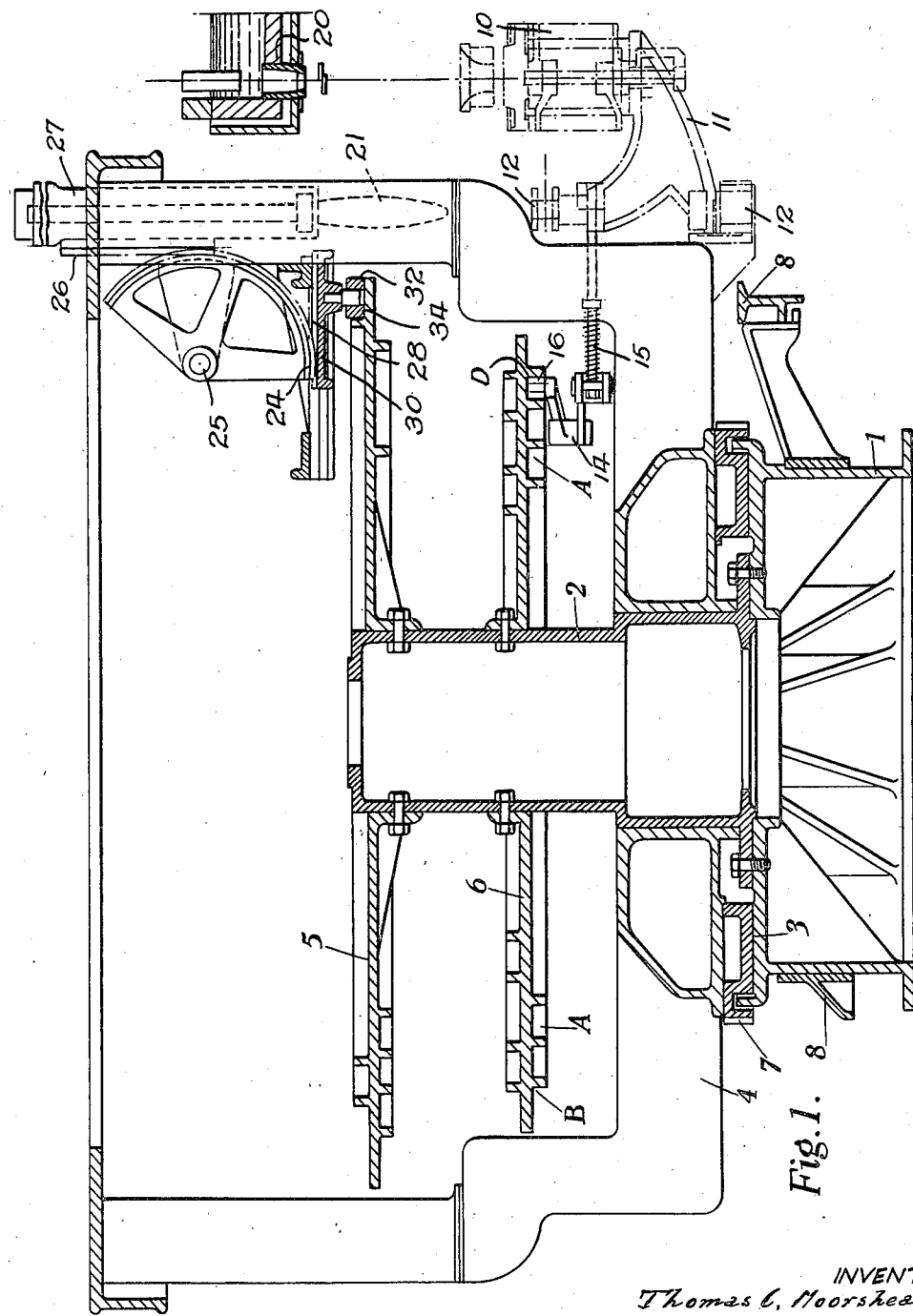

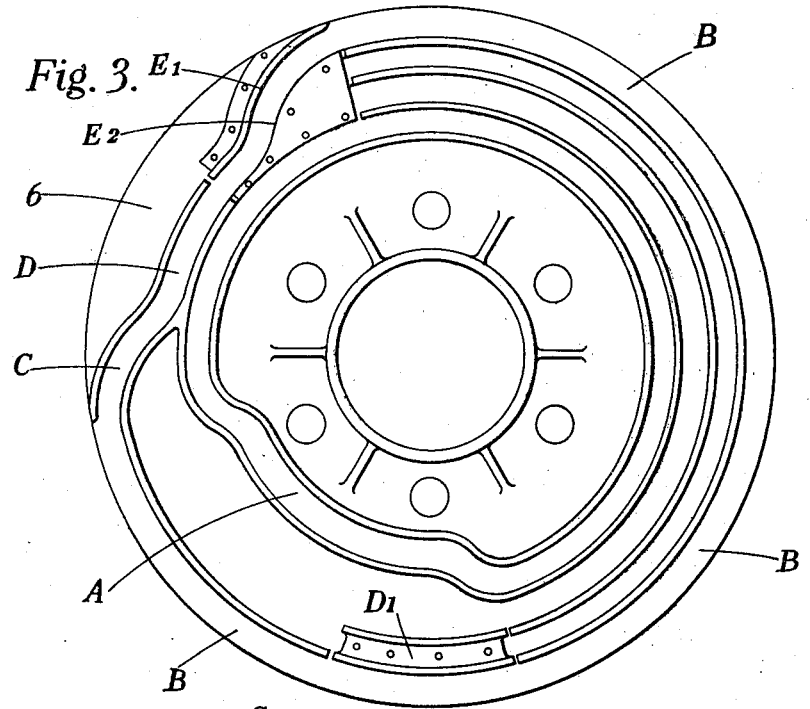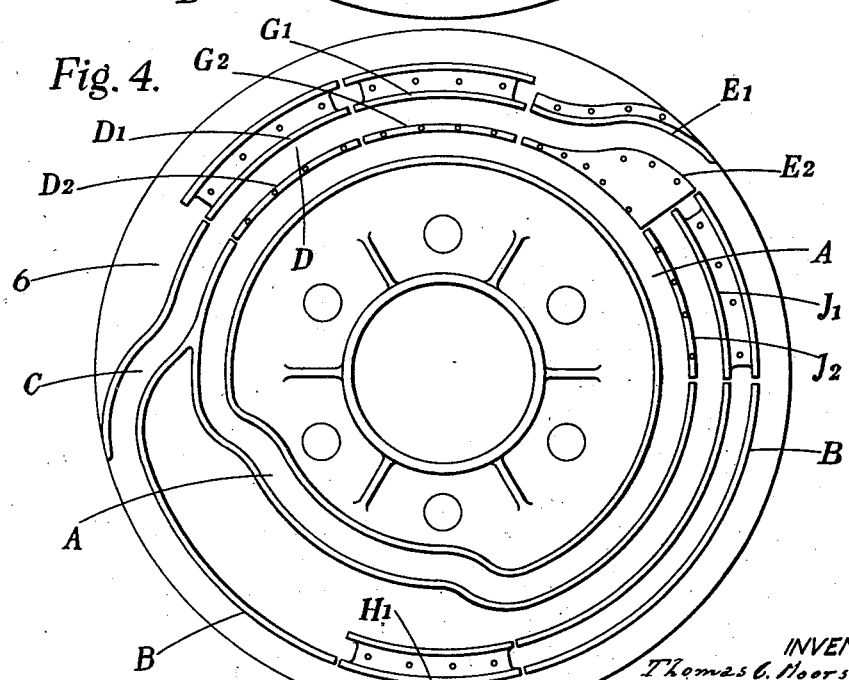

Patented Feb. 1, 1938

2,107,011

UNITED STATES PATENT OFFICE 2,107,011

MACHINE FOR MAKING HOLLOW GLASS-WARE

Thomas Courtney Moorshead and Edgar Philip Dorman, Strand, London, England, assignors, by mesne assignments, to Ball Brothers Company, Muncie, Ind., a corporation of Indiana Application August 15, 1933, Serial No. 685,269
In Great Britain August 1, 1933

6 Claims. (Cl. 49—9)

This invention refers to machines for making hollow glassware and more particularly to those types of machines which are known in the art as pressed ware machines, and press and blow machines respectively.

It is to be understood that pressed ware machines are here referred to as those in which a charge of molten glass is pressed or formed at one operation into a completed article within a mold by the action of a pressing plunger co-operating with the mold, while press and blow machines are here referred to as those in which a charge of molten glass is first partially formed within a mold known as the blank or parison mold by the action of a pressing plunger co-operating with this mold, and is later transferred to another mold known as the finishing mold in which the article is blown to its final form with compressed air.

It may be stated broadly that the pressed ware system is confined essentially to the production of articles whose final interior form permits of the withdrawal of the plunger after pressing, while the press and blow system is not limited by the interior form of the article to be produced.

There are other factors well-known to the art that determine the suitability of an article for manufacture by one system or the other, and although there are previous machines which would manufacture either pressed ware or press and blow ware, in converting these machines from press and blow ware to pressed ware, it has not been possible to obtain high speeds from the machine for pressed ware. The present invention seeks to overcome this difficulty and to provide a machine which is readily adaptable for the production of either class of ware and at the same time maintaining a high production speed both for press and blow ware and for pressed ware.

The invention is particularly applicable to glass shaping machines of the type in which a plurality of molds are mounted for rotation around one or more stationary cams adapted to control the operations or movements of the various elements of the machine in synchronized succession and, as an example of one form of machine of this type, reference may be made to U. S. Patent No. 1,807,857 wherein is described a press and blow type machine in which a plurality of two part body blank molds spaced around an outer circle and a plurality of pressing plungers and two part finishing and neck molds spaced around an inner circle all revolve in unison around a common centre. Once in each complete revolution, each blank mold is caused in turn, to come into axial alignment with a glass feeding device where it receives a charge of molten glass, after which the charged blank is moved from the outer mold circle to the inner mold circle where it co-operates with one of the plungers and neck molds, and the pressing of the parison takes place. After pressing, the two halves of the blank mold are separated and returned to their place on the outer mold circle, leaving the parison suspended from the neck mold. One of the finishing molds is then raised from an inoperative position with its two halves separated so as to register with the neck mold, the two halves are closed around the pendant parison and the bottle is blown to its final form by compressed air. After the completion of the blowing operation, the neck mold is opened to release the bottle and the finishing mold still closed around the bottle is lowered to the inoperative position in which it continues to revolve with the rest of the machine until a point is reached at which the bottle is delivered by the opening of the two halves of the finishing mold. After the two halves of the blank mold have been opened, upon the completion of the pressing, and returned to the outer mold circle they continue to move whilst open until, in the course of revolution, each, in turn, approaches the charging position, when the two halves of the blank mold are closed in readiness to receive a fresh charge of glass.

In order to convert glass shaping machines of the above types from press and blow ware machines to pressed ware machines, it is necessary or advisable for the attainment of the most satisfactory results and high production speed to make provision for varying the duration of certain of the operations or steps performed by the machine and, in accordance with the present invention, the machine incorporates means for varying the duration of the period the pressing plunger remains in intimate contact with the glass.

The invention also consists in the provision of means for enabling the contour of the aforesaid cam or cams to be varied in order to convert the machine from a press and blow machine to a pressed ware machine or vice versa.

The invention further consists in an improved form of glass shaping machine incorporating a plurality of removable or interchangeable cam sections or elements adapted to facilitate conversion from one type of machine to the other.

In order that the said invention may be clearly understood and readily carried into effect, the same will now be more fully described with reference to the accompanying drawings which illustrate, by way of example, one convenient mode of carrying the invention into effect as applied to a machine of the type described in the aforementioned United States patent No. 1,807,857 and in which:—

Figure 2:
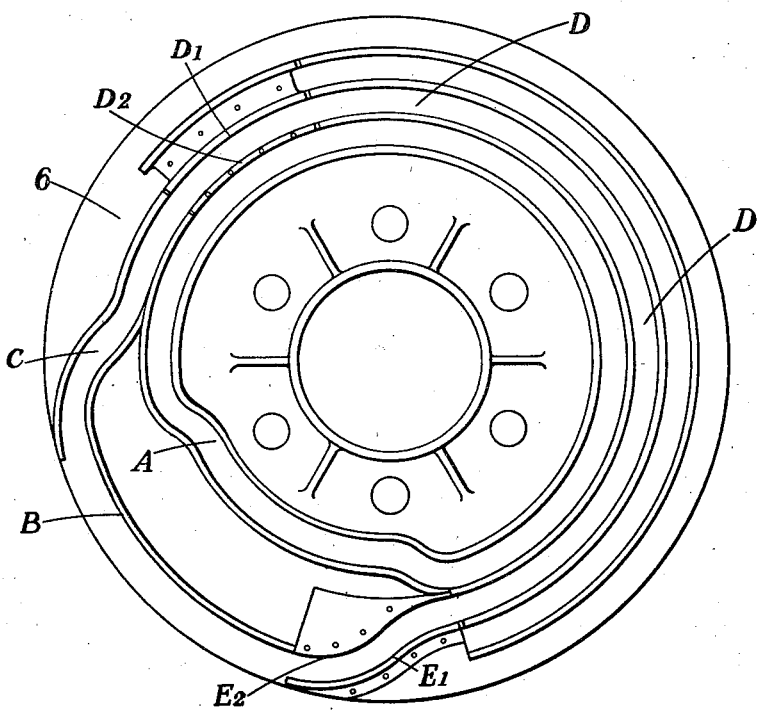

Fig. 1 is a vertical sectional view of a portion of the structure of a machine according to the present invention incorporating a series of molds mounted for rotation around a plurality of stationary cams; and Figs. 2, 3 and 4 are inverted plan views of one of the cam rings shown in Fig. 1 incorporating means for enabling the cam contours to be varied.

The machine described in U. S. patent No. 1,807,857 and shown diagrammatically in Fig. 1 comprises a stationary base 1 of cylindrical form, the upper end of which is provided with an inwardly extending flange, the outer portion of such flange being formed as a flat bearing surface 3 of annular form adapted to support the rotary portion or frame 4 of the machine and the inner portion of such flange being adapted to support the stationary central column 2 which is bolted thereto. The rotary frame 4 carries the molds 10 and their actuating means or linkage and is adapted to be rotated by a spur gear 7 which is secured to it and meshes with a pinion driven from any suitable source of power. To the column 2 are secured stationary cam rings 5 and 6 upon which are formed the cams which control the movements of the various elements of the machine as is described in detail in U. S. patent No. 1,807,857. Each mold 10 is mounted upon a swinging arm 11 pivoted at 12 in bearings carried by the rotary frame 4, the pivots being vertically disposed so that the molds remain upright throughout their movements. The arm 11 is operated from a cam track D formed upon the underside of the cam ring 6 through the medium of a cam lever 14 and a connecting rod 15, the cam lever being provided with a cam roller 16 engaging the cam track and the arrangement being such that the cam track causes the mold to move so that at times it is rotating in an outer circle beneath a glass feeding means indicated at 20 and, at other times, it is rotating in an inner circle beneath a pressing plunger shown at 21. Means are provided for raising and lowering the pressing plunger and include a toothed sector 24 mounted to swing upon a shaft 25 carried by brackets extending upwardly from the rotary frame 4. This toothed sector engages both with a toothed rack 26 on a crosshead 27 carrying the pressing plunger and with a second toothed rack 28 on a slide 30 movable horizontally on the rotary frame 4 by a cam roller 32 engaging in the cam track 34 on the upper cam ring 5. Attached to the outer surface of the cylindrical trunk portion of the base 1 is a stationary cam track 8 by which the finishing molds are raised and lowered as they move around the central column.

In converting a machine of the type described above into a pressed ware machine, the finishing molds are dispensed with since in machines of the latter type the articles are formed to completion within shaped molds corresponding or functioning in a manner similar to the aforesaid blank molds. These molds and their associated parts may, however, be caused to move in the same manner as before except that it is desirable to vary or to provide means for varying the timed sequence in which the movements occur. For example, in some instances, it is desirable to provide for keeping the pressing plunger in contact with the glass until the delivery of the finished ware from the mold. Alternatively, the pressing plunger may be kept in contact with glass for a less period so as partially to chill it and, after, raising the plunger to an inoperative position, compressed air may be introduced within the article so as to keep it fully expanded and in contact with the walls of the mold cavities until the point is reached at which the molds are opened to deliver the ware. In other respects, the cycle of operations when using the machine for pressed ware is similar to that employed when using the machine for press and blow ware, the shaped molds being closed as they approach the feeding position and, after receiving the appropriate charge of molten glass, being swung from the outer mold circle into the inner mold circle for pressing. After the pressing or shaping operation, the two halves of the shaped mold may be opened to deliver the ware or, in instances in which a neck mold or neck ring is employed, to leave the ware suspended from the said neck mold or neck ring which is opened subsequently. If desired, a suitable collecting means may be provided for receiving the finished ware as it falls from the shaped mold or the open neck mold or ring, in which collecting means the ware may be carried round by the rotary part of the machine to some point which is more convenient for the delivery of the finished products. In the case of the press and blow system, the blank molds are returned to the outer mold circle after a short interval for pressing. As indicated above, however, it is advisable when using the machine for pressed ware, to provide for a longer pressing interval and this may be accomplished by transferring the various actuating cam paths that cause the movements of the mold mechanism around the stationary cam rings 5 and 6 from a position in which they are suited to the timed sequence of one cycle to a position in which they are suitable to the other cycle. The preferred means for transferring the actuating cam paths around the stationary cam rings 5 and 6 are similar or the same for all of the cams, varying only in the relative angular distances they may each be transferred, and it will, therefore, only be necessary to describe the means employed for one of such cams.

In Fig. 2 there is shown an inverted plan view of the cam ring 6 which is shown in Fig. 1 and on the outer portion of which is disposed the cam track which controls the movements of the molds from one mold circle to the other. This cam track comprises an outer circular or arcuate portion B, and actuating or mold displacing cam path C, an inner circular or arcuate portion D and an actuating or mold displacing cam path formed by a pair of detachable cam segments indicated at $E_1$ and $E_2$. The inner circular or arcuate cam portion D also includes a pair of detachable cam segments which are indicated at $D_1$ and $D_2$ and are approximately the same arcuate length as the segments $E_1$ and $E_2$. As shown in Fig. 2, the cam is suited for the press and blow cycle, the formed cam path C being adapted to move the blank molds, after they receive their charges of molten glass, from the outer mold circle to the inner mold circle, the outer arcuate cam path B being adapted to maintain the blank molds in the inner mold circle path whilst the pressing operation is effected, the cam path formed by the elements $E_1$ and $E_2$ being adapted to cause the blank molds, after pressing is completed, to be returned to the outer mold circle and the inner arcuate cam path D being adapted to maintain the blank molds in the outer mold circle path until they have been recharged and are again ready to be moved inwardly for pressing. In order to render the aforesaid cam track suitable for the pressed ware cycle, the cam segments $E_1$ and $E_2$ are interchanged with the cam segments $D_1$ and $D_2$ with the result that the cam path then has the form shown in Fig. 3 and the length of the outer arcuate cam path B is considerably increased so that the molds will be maintained in the inner mold circle path for a longer period during the whole of which the pressing plunger may be maintained in intimate contact with the glass so as completely to cool and solidify same or the arrangement may be such that the pressing plunger is maintained in contact with the glass for only a portion of such period and the partially solidified product is maintained or expanded against the walls of the molds by compressed air.

In some instances, it is desirable to provide for further variations in the timing of certain operations. For instance, it is frequently desirable that the moment at which the pressing plunger is raised out of contact with the glass after pressing shall be variable. Similarly, it is sometimes desirable to provide for further variations of the point at which the molds are returned to the outer mold circle path after the completion of the pressing operation. Reference will now be made, therefore, to Fig. 4 which illustrates, by way of example, one means which may be employed for further varying the point at which the molds are returned to the outer mold circle although similar means may be employed in connection with any of the other cams for which variable timing is required. As shown in Fig. 4, the aforesaid cam path made up of the elements or portions B, C, D, $E_1$ and $E_2$ is provided in addition to the detachable cam segments $D_1$ and $D_2$, with a plurality of similar or identical pairs of cam segments $G_1$ and $G_2$, $H_1$ and $J_1$ and $J_2$ for any one pair of which the cam segments $E_1$ and $E_2$ may be substituted. The segment $H_1$ has an associated segment identical in shape and size with the segments $D_2$, $G_2$ and $J_2$ but which is not shown. Also, the elements $G_1$, $H_1$ and $J_1$ are constructed so that they are adapted to form parts of the outer arcuate cam path B as well as parts of the inner arcuate cam path D. In this figure the cam segments $E_1$ and $E_2$ of Fig. 2 are shown interchanged with the cam segment $H_1$ and its associated segment but it will be apparent that they may be interchanged with any of the other pairs of cam segments and that the number of different points in the cycle at which the molds may be returned to the outer mold circle will correspond with the number of pairs of arcuate cam segments of the form of the segments $G_1$, $G_2$ which are provided.

It will be observed that the cam ring 6 also includes a cam track A. This cam track is adapted to control the opening and closing movement of the finishing molds when the machine is operating according to the press and blow cycle but, as the finishing molds are not required when operating according to the pressed ware cycle, this cam track does not need to be altered when changing over to the latter cycle.

Having thus described this invention what we claim as new therein and desire to secure by Letters Patent, is:—

1. A glass shaping machine of the press and blow type, comprising the combination of a central vertical column, a frame rotatable about said column and having a plurality of molds mounted thereon, supporting arms for the molds, means for shifting the supporting arms with the molds thereon so that at times the molds are rotating in an outer circle and at other times in an inner circle, a glass feeder arranged over a part of the outer circle for depositing glass in the molds, means for subjecting to a pressing operation the charges of glass deposited in the molds by the feeder, and a stationary cam track cooperating with said mold-shifting means and having a portion for guiding the molds in an inner circle, a portion for guiding the molds in an outer circle, and a portion for connecting the mold-guiding portions, said connecting portion being interchangeable with other portions of the cam track for varying the relative lengths of said guiding portions enabling the machine to be converted into a pressed ware machine.

2. A glass shaping machine of the press and blow type and convertible into a machine of the pressed ware type, comprising the combination of a central vertical column, a frame rotatable about said column, a plurality of horizontally disposed mold supporting arms, a mold carried by each of the said arms, means for swinging the supporting arms and the molds carried thereby so that at times the molds are rotating in an outer arcuate path and at other times are rotating in an inner arcuate path, a stationary cam carried by the said column, a plurality of pressing plungers, means for depositing charges of glass in the molds while they are in the outer arcuate path, means operated by the stationary cam to cause the pressing plungers to press the charges of glass in the molds while the latter are in the inner arcuate path and a second stationary cam cooperating with said mold-swinging means and having a portion for guiding the molds in an inner circle, a portion for guiding the molds in an outer circle, and a portion for connecting the mold-guiding portions, said connecting portion being interchangeable with other portions of the cam track for varying the relative lengths of said guiding portions thereby enabling the relative lengths of the inner and outer arcuate paths to be varied.

3. A glass shaping machine comprising the combination of a central vertical column, a frame rotatable about said column and having a plurality of molds mounted thereon, a stationary cam track carried by said column, said cam track being made up of inner and outer arcuate portions and interconnecting portions, means actuated by said cam track to control the paths traversed by the molds so that at times the molds move in an outer arcuate path and at other times move in an inner arcuate path, and said interconnecting portions of the cam track being made up of elements interchangeable with other elements of the cam track to vary the relative lengths of the inner and outer arcuate portions.

4. A glass shaping machine of the press and blow type and convertible into a machine of the pressed ware type, comprising the combination of a central vertical column, a frame rotatable about said column and having a plurality of molds mounted thereon, a stationary cam track mounted on the column, supporting arms for the molds, means by which the stationary cam track is caused to move the supporting arms with the molds thereon so that at times the molds are rotating in an outer circle and at other times are rotating in an inner circle, a glass feeder arranged over a part of the outer circle for depositing charges of glass in said molds, means for subjecting to a pressing operation the charges of glass deposited in the molds by the feeder, a second stationary cam track mounted on the column, and means controlled by said second cam track for actuating said pressing means, each of the said cam tracks being made up of an inner arcuate portion, an outer arcuate portion and an interconnecting portion, and the said interconnecting portion being made up of elements interchangeable with other elements to increase the length of one arcuate portion and decrease the length of the other arcuate portion.

5. In a glass shaping machine, a cam plate, a substantially circular guide rail mounted on the operative face of said plate and defining the inner wall of an inner cam track, a second guide rail substantially concentric therewith mounted on the operative face of said plate and defining the inner wall of an outer cam track, an eccentric guide rail connecting the first-mentioned guide rail with the second guide rail to connect the inner cam track with the outer cam track, said first-mentioned and second guide rails having detachable segments, and a detachable eccentric guide rail segment adapted to be interchanged with said detachable segments to connect said guide rails.

6. A glass shaping machine comprising a frame rotatable about a vertical axis, a plurality of molds pivotally supported on said frame, a cam having an inner guide track and outer guide track, means for connecting the inner and outer tracks of said cam, means for rotating said frame, means associated with said molds and cooperating with the tracks on said cam for causing the molds to travel for a portion of each revolution of the frame in an inner circle and for the remainder of such revolution in an outer circle, said track-connecting means being interchangeable with other portions of said track to vary the distance through which said molds travel in each of the inner and outer circles.

THOMAS COURTNEY MOORSHEAD.
EDGAR PHILIP DORMAN.